J. G. LEFLER
Carriage-Fender.
No. 609.
Reissued Oct. 5, 1858.
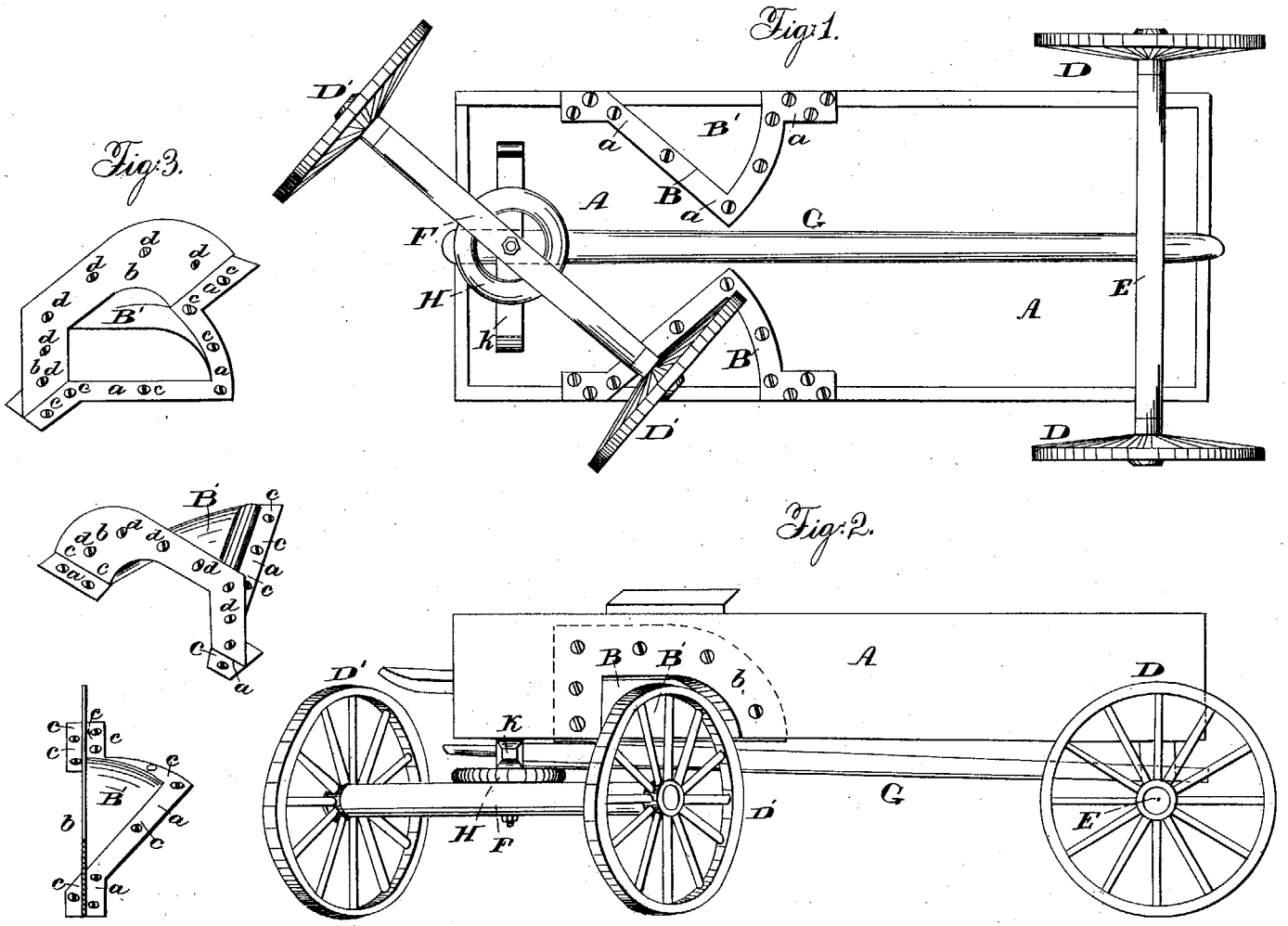
N. PETERS, PHOTO-LITHOGRAPHER, WASHINGTON, D. C.

UNITED STATES PATENT OFFICE.

J. GEORGE LEFLER, OF PHILADELPHIA, PENNSYLVANIA.

IMPROVEMENT IN WEAR-IRONS FOR CARRIAGES.

Specification forming part of Letters Patent No. 18,153, dated September 8, 1857; Reissue No. 609, dated October 5, 1858.

*To all whom it may concern:*

Be it known that I, J. G. LEFLER, of Philadelphia, in the county of Philadelphia and State of Pennsylvania, have invented certain new and useful Improvements in the Construction of Carriage and Wagon Bodies; and I do hereby declare the following to be a full, clear, and exact description thereof, reference being had to the accompanying drawings, which form part of this specification.

My invention has for its object the construction of bodies of carriages or other vehicles in such manner that the forward wheels may readily run sufficiently into and under the body to make the vehicle capable of turning in a small space, while at the same time such portions of the body as might come into contact with the wheels are protected from wear by metallic surfaces, and the vehicle, embracing the capacity of so turning in a small space, may be made as strong and durable as, and at very little more expense than, an ordinary carriage or other vehicle body not embracing any such advantageous feature; and it consists in the construction of the bodies of carriages or other vehicles with metallic recessed guards, arranged in and secured thereto by means of flanges and screws or bolts, as hereinafter more fully described.

To enable those skilled in the art to make and use my invention, I will proceed to describe its construction and operation, referring by letters to the accompanying drawings, where—

Figure 1 represents a bottom view of a wagon embracing my improvement; Fig. 2 represents a side elevation of the same, and Fig. 3 represents perspective views of the metallic recessed guard.

Similar letters denote the same parts in different views.

A represents the body of a wagon, of which E is the back axle, D D the hind wheels, F the front axle, D′ D′ its wheels, G the perch, H the "fifth-wheel," and K the springs on forward axle, and which parts, not constituting any portion of my invention, need not be here particularly described.

B represents the "metallic recessed guard," the construction of which will be best understood by reference to Fig. 3, and the manner in which it is combined with or arranged in the body of the vehicle, and secured thereto, by reference to Figs. 1 and 2. Said metallic recessed guard is formed with a cavity (marked B′) to accommodate the wheel, (which is intended to run into it, as seen at Figs. 1 and 2,) and with a continuous bottom flange, (marked *a*,) which bears against the lower surface of the bottom of the body, and also with a side flange, *b*, which bears against the inner surface of the side of the body of the vehicle. Said flanges *a* and *b* are respectively secured firmly by screws or otherwise to the bottom and sides of the body, against which they bear, the bottom and sides of the body of the vehicle being cut out sufficiently only to accommodate the cavity B′, or recessed portion of the guard, and allow the flanges *a* and *b* to come into contact with their respective bearing-surfaces in the bottom and sides of the body, as before described. The side flange, *b*, is represented as having a greater superficial or bearing surface than the flange *a*, since it is deemed requisite that it should be somewhat stronger than the bottom flange; but the dimensions of the flanges and their relative amounts of bearing-surface may be varied at the discretion of the builder.

*c c* and *d d* represent the screws by which the flanges *a* and *b* are respectively secured to the bottom and sides of the vehicle's body. It is, however, obvious that other means of fastening the flanges to the body may as readily and advantageously be adopted.

Though the cavity B′ of the metallic recessed guard is represented as being of such depth and shape as to allow the wheel D′ of the front axle to pass a short distance into and under the body of the wagon, it is obvious that the said metallic recessed guard may have its cavity B′ so modified in form and degree as to allow the said wheel to pass farther into and under the body of the wagon without changing the nature of my invention. It will also be understood that said metallic recessed guard may be modified in form as circumstances require. For instance, where the diameter of the wheel and the distance from the center of wheel to the bottom of the body of the carriage bear a different relative proportion to each other than that represented the form of the metallic recessed guard would have to be varied from that shown, to allow the wheel to run under (or swivel) to the same extent as seen in the drawings.

I am well aware that the bodies of carriages and other vehicles have been constructed with "goosenecks," also with recesses of different forms and capacities to accommodate the forward wheels, or allow them to run under or partially under and into the body of the carriages, but do not consider any such construction of body as embracing the same principle as or advantages possessed by my improvement, since where the gooseneck or partial recesses are adopted it is necessary, in order to render the body sufficiently strong and durable, to expend a considerable amount of labor in so constructing the body (or in the formation) as to gain sufficient strength to compensate for the weakness naturally consequent to the entire or partial severance of the bottom and sides of the body, while with my improvement the severed portions of the body are united by the metallic recessed guard, and may be severally embraced and strengthened to any required extent by extending to any desired capacity the holding flanges *a* and *b*, which are firmly united to the several parts of the body with which they come in contact by screws or otherwise; and the guard itself is rendered, by its character of formation, (having an arch-like recess and flanges lying in different direction,) capable of sustaining more weight and strain than the portion of the body which would occupy its place were it not there, while at the same time, being metallic, it (the guard) is made to possess the advantages ascribed to it without materially increasing the weight of the structure or rendering it more costly.

I am also aware that the bodies of vehicles have been constructed with metallic guards or wear-irons, to protect the body from injury by the working of the wheels in turning; but I do not conceive such devices to be equivalent to my metallic recessed guard, since they do not possess the features of construction or advantageous results embraced by my improvement.

Having fully described my improvement in the construction of carriage or other vehicle bodies, and disclaiming the formation of goosenecks or recesses in the bodies of vehicles, and disclaiming the use of metallic guards or wear-irons, what I do claim as new, and desire to secure by Letters Patent, without limiting myself to any precise form or exact proportion, is—

The construction of carriage or other vehicle bodies with a metallic recessed guard, constructed and arranged in the body of the vehicle, substantially as described, for the purposes set forth.

In testimony whereof I have hereunto set my hand and affixed my seal this 21st day of July, 1858.

J. GEORGE LEFLER. [L. S.]

Witnesses:
HUGH CLARK,
BRITTON ELY,
GUSTAVUS BERNSTEIN.